Dec. 24, 1940.　　　　E. V. BOREL　　　　2,225,616
ELECTRIC FURNACE FOR MELTING GLASS
Filed Aug. 10, 1937　　　　4 Sheets-Sheet 1
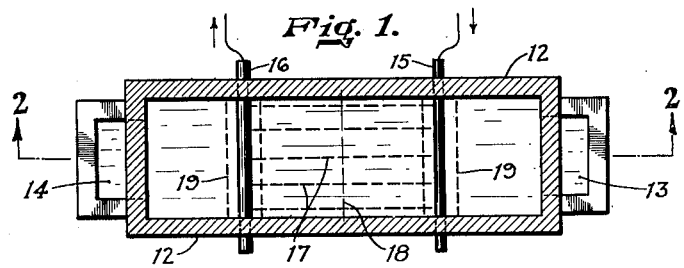
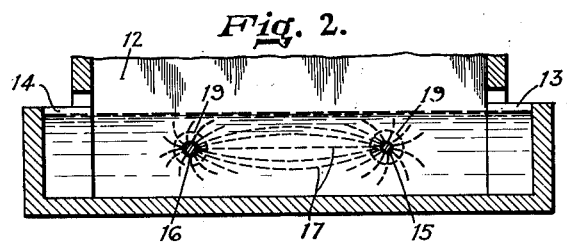
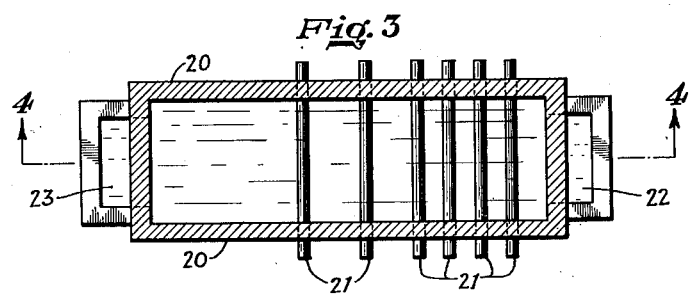
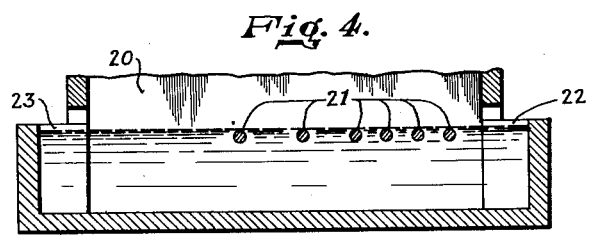
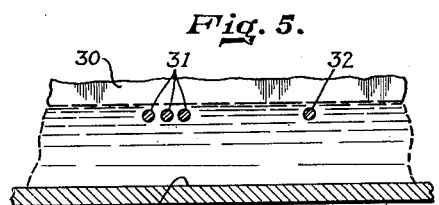
INVENTOR
*EDOUARD VIRGILE BOREL*
BY
*Richards & Geier*
ATTORNEYS Dec. 24, 1940.  E. V. BOREL  2,225,616
ELECTRIC FURNACE FOR MELTING GLASS
Filed Aug. 10, 1937   4 Sheets-Sheet 3
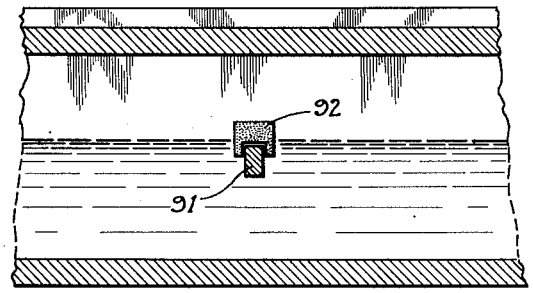
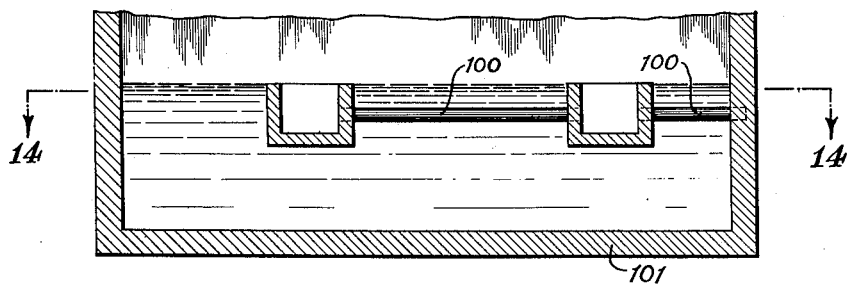
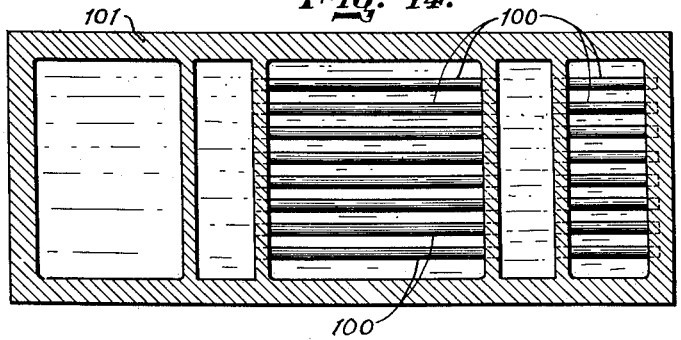
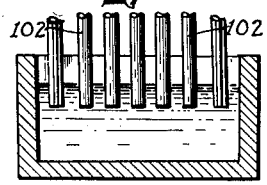
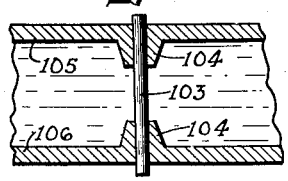
INVENTOR
EDOUARD VIRGILE BOREL
BY
ATTORNEYS

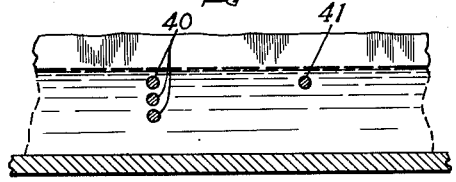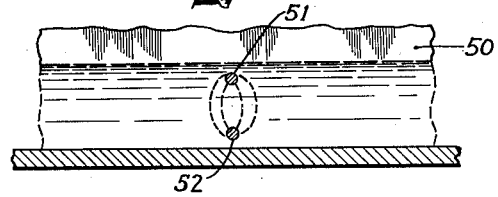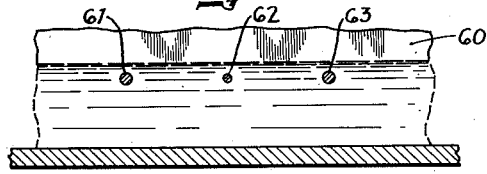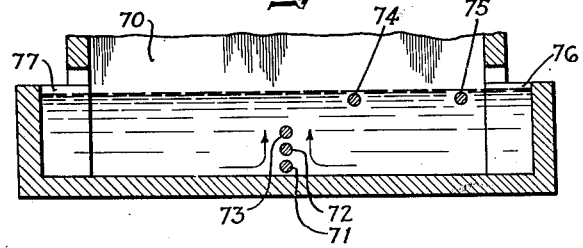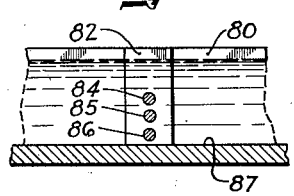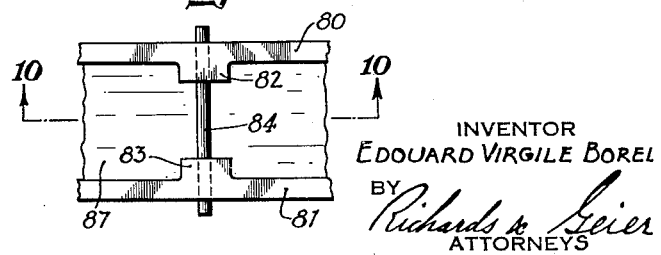

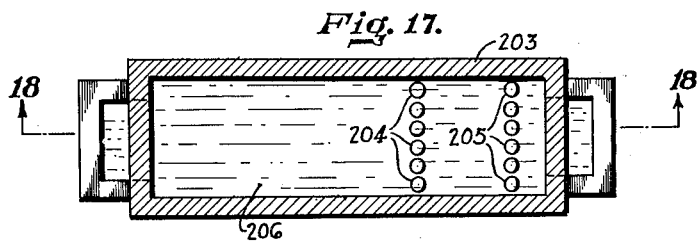
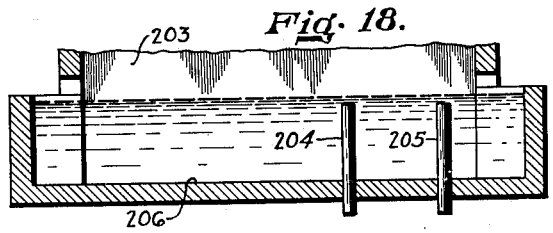
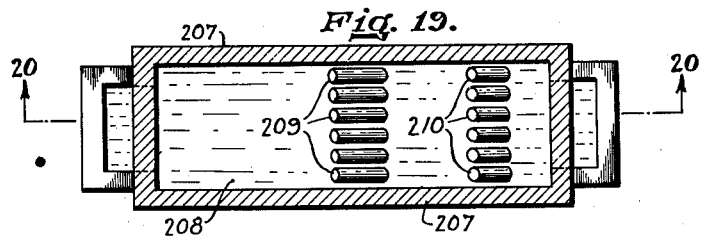
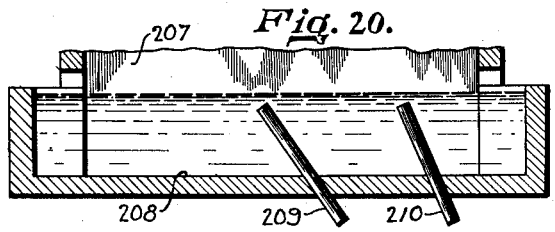
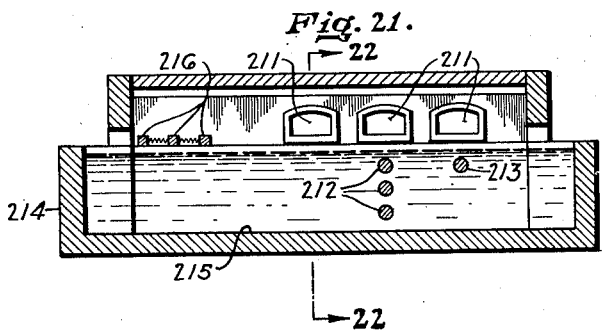
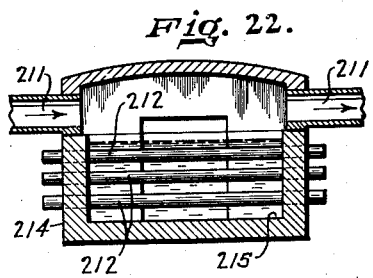

Patented Dec. 24, 1940

2,225,616

UNITED STATES PATENT OFFICE 2,225,616

ELECTRIC FURNACE FOR MELTING GLASS

Edouard Virgile Borel, Sous-le-Poyet at Romont, Switzerland, assignor to Societe Anonyme des Manufactures des Glaces & Produits Chimiques de Saint-Gobain, Chauny & Cirey, Paris, Seine, France Application August 10, 1937, Serial No. 158,347
In Germany August 14, 1936

14 Claims. (Cl. 13—6)

This invention relates to a method and means for melting glass and refers more particularly to tank furnaces which are heated either totally or in part by an electrical current flowing through the glass mass and heating said glass by the Joule effect.

In tank furnaces used for the continuous manufacture of glass articles of all types it is customary to introduce raw materials into one end of the elongated furnace and to cause them to flow at a substantially constant level through the furnace while they are being heated, while glass in the finished state is removed from the opposite end of the furnace.

It follows that these furnaces contain at one and the same time a glass bath containing vitreous materials in different stages of chemical composition, namely, unmolten glass, glass in the course of fusion, glass in the course of the refining process, and glass in the finished state. The glass bath has also different temperatures, starting, for example, with temperatures less than 1000° C. at the input zone; glass in the course of fusion and refining may reach a temperature of 1450° C., while in the utilization zone the temperature may be as low as 1200° C.

In the electrically heated tanks, already in use, for the purpose of preserving the electrodes from the current of glass flowing from the supply to the delivery end of the furnace, the electrodes were placed in recesses provided in the side walls of the tanks, or in the front walls of the tanks, but in this latter case, the feeding of the raw materials and the removal of finished glass were made in the zones situated between the electrodes. The purpose of this arrangement was to avoid the renewing of glass in contact with the electrodes.

It was found that devices of this type did not operate properly due to several drawbacks and it has never been possible to produce with these devices glass of sufficiently high quality to be used in the manufacture of glass articles requiring well refined glass such as bottles, window-glass, etc.

The reason is that in these prior processes the electric current flowing through the glass mass was not controlled in a proper manner so as to give homogeneous molten glass. Furthermore, due to the fact that the density of glass varies with the temperature and is a different one at different stages of its manufacture, there is a continuous circulation of glass in the tank between the hotter and the cooler portions of the glass mass. The raw materials are lighter than the molten ones and tend to remain on the surface of the bath. Badly refined materials tend to flow on the top of the bath from the zone of fusion to the removal zone, while refined glass tends to flow along the bottom of the furnace back to the fusion zone, in the longitudinal direction of the furnace.

In the manufacture of glass it is well known that the molten glass must be subjected to a high temperature in order to get well refined glass of a high quality, but it has also been found unnecessary to leave such glass mass at this high temperature during an excessive period of time for it results in an undue consumption of heat without any advantage.

Another drawback of known processes is that the disposition of the electrodes and the operation of the furnace are such that an excessive amount of energy is required in order to attain the high temperature necessary for the manufacture of glass of high quality.

An object of the present invention is the provision of a method of melting glass which will require a comparatively small expenditure of energy and by means of which it will be possible to obtain a homogeneous glass mass of very high quality.

For this purpose, according to the present invention the heat produced by the electrical current is concentrated in certain well defined zones which extend across the entire furnace and which can have any desired form or location as far as the remaining portion of the glass mass is concerned.

In accordance with the present invention these zones or portions of the glass mass subjected to high temperatures are so arranged that the entire glass mass moving through the furnace from the point of supply of the raw materials to the point of delivery of molten glass is caused to pass through these zones and to remain there for a predetermined period of time.

Consequently, in accordance with the present invention the glass at a predetermined moment of its manufacture is heated to a much higher temperature than was possible in prior art and is maintained at that temperature during the prerequisite time.

This may be realized through the provision of a tank furnace the electrodes of which are situated in the path of the current of glass circulating between the supply orifice and the working compartment or the delivery end of the furnace, and transversely to the direction of this main current. The electrodes are, preferably, completely immersed in the glass.

Furthermore, in accordance with the present invention, at least one of the electrodes situated in the path of the glass has an area of contact with the glass which is comparatively small in comparison with the cross-sectional area of the glass flowing between the electrodes. Due to this arrangement the density of the electric current in the zones surrounding the electrodes is greater than in the more remote portions of the glass mass so that the amount of electrical energy per unit of volume of glass and, consequently, the temperature of the glass in these zones are higher than in other parts of the tank.

Due to this arrangement one or more high temperature zones are provided in the furnace around the electrodes. The temperature in these zones may be easily regulated by changing contact areas of the electrodes with the glass. Furthermore, since the high temperature zone surrounds the electrode, its form and its position may be easily varied by varying the form of the electrode and by placing it in any selected section of the tank. The dimensions of the electrodes and of their areas of contact with the glass may also vary with the type of glass to be manufactured. In order to produce a glass of high quality, it is necessary to arrange these electrodes in such a manner that the whole mass of glass in the course of its flow from the supply to the delivery end of the furnace shall pass through these highly heated zones, and it is advisable that the direction of the electrical current flowing between the electrodes shall coincide with the direction of flow of the glass from the supply end to the delivery end of the furnace.

Finally, in accordance with the present invention the electrodes projecting into the glass mass form obstacles which are contacted by the glass mass moving through the furnace, thereby facilitating the melting of the glass.

The invention will appear more clearly from the following detailed description when taken in connection with the accompanying drawings showing by way of example preferred embodiments of the inventive idea.

In the drawings:

Figure 1 is a horizontal section through a tank furnace constructed in accordance with the principles of the present invention;

Figure 2 is a section along the line 2—2 of Figure 1;

Figure 3 is a horizontal section through a furnace of a somewhat different type;

Figure 4 is a section along the line 4—4 of Figure 3;

Figures 5 to 10 are vertical sections through different furnaces and illustrate the positions of the electrodes therein;

Figure 11 is a top view of the furnace shown in Fig. 10;

Figure 12 is a partial longitudinal section through another furnace;

Figure 13 is a longitudinal section through a different furnace;

Figure 14 is a horizontal section through the furnace shown in Fig. 13;

Figure 15 is a cross-section of a furnace in which the electrodes are vertical;

Figure 16 is a partial horizontal section of another furnace;

Figure 17 is a horizontal section through a different furnace;

Figure 18 is a vertical section along the line 18—18 of Fig. 17;

Figure 19 is a horizontal section through a different furnace;

Figure 20 is a vertical section along the line 20—20 of Fig. 19;

Figure 21 shows another furnace in vertical section; and

Figure 22 is a cross-section along the line 22—22 of Fig. 21.

In the furnaces shown in the drawings the electrodes are placed in the current of glass flowing from the feeding end of the raw materials or batch to the delivery end of the furnace in such a manner that all the particles of the materials to be melted and treated pass in the neighbourhood of these electrodes.

The furnace shown in Figures 1 and 2 of the drawings comprises heat resisting side walls 12 and an opening 13 for the introduction of raw materials. The molten glass is removed from the opposite end 14 of the furnace so that the glass mass flows through the furnace from its end 13 to its opposite end 14. The electrodes 15 and 16 having for example the form of cylindrical rods, are carried by the side walls 12 of the furnace and extend at right angles to its longitudinal axis and to the direction of movement of the glass mass within the furnace.

The two electrodes 15 and 16 are connected to a source of electrical energy not shown in the drawings in such manner that an electrical current is caused to flow between these electrodes. It is apparent that the electrical resistance between these two electrodes depends upon an easily predeterminable section of the glass mass situated therebetween and also upon the so-called contact resistance between the electrode surfaces and the glass. Both of these quantities can be easily regulated to provide the desired glass temperatures.

The two electrodes 15 and 16 may be used for a single-phase electrical current but groups of two, three or more electrodes are preferably used for polyphase currents, as shown in Figure 8.

The electrodes 15 and 16 are for instance round in cross section and have the form of cylindrical rods. The lines of electrical current extending between the electrodes are designated by the numeral 17 in the drawings.

The diameters of the electrodes 15 and 16 are so selected that their contact areas with the glass are smaller than the cross-sectional area of the glass mass situated between the electrodes and traversed by the electrical current in the course of the operation of the furnace. In other words, the outer surfaces of the two electrodes 15 and 16 are smaller than the cross-sectional area of the tank at that portion thereof which is designated by the numeral 18 in Figure 1, or the surface of contact of at least one of the electrodes with the glass mass is smaller than half the cross-sectional area of the current of glass flowing between the electrodes. In fact, good results were obtained with electrodes having a lateral surface equal to a third of the cross-sectional area of the current of glass.

Due to their size around each of the electrodes 15 and 16 is formed a zone 19. In those zones the density of the electrical current (represented by the lines 17) is particularly great so that the glass situated in these zones is heated to a higher temperature than the glass which is situated in the sections of the furnace lying between these zones. Furthermore, in the zones themselves the temperature increases with the approach of a glass particle to the surface of the electrode. This temperature is also dependent upon the surface area of the electrodes and is higher when this area is smaller in relation to the cross-sectional area of the glass mass situated between the electrodes.

An important advantage of this arrangement is that when a given predetermined voltage is applied to the electrodes the amperage does not depend solely upon the total resistance of the glass mass situated between the zones surrounding the electrodes, i. e., it does not depend solely upon the distance between the electrodes. In accordance with the present invention the amperage depends primarily upon the area of the surface of the electrodes, the resistance offered to the passage of the electric current in the glass mass adjacent the electrodes being so much greater as said surface is smaller. It is thus possible without changing the distance between the electrodes to regulate the electrical resistance within the tank by suitably dimensioning the surface areas of the electrodes. Therefore, in accordance with the present invention a glass melting furnace may be adapted to any available voltage and a desired electrical energy may be produced therein without changing this voltage.

In the case of a given predetermined power, the diameter of the electrodes should be so selected that it is comparatively small, when the voltage is high. By using two electrodes 15 and 16 of two different diameters it is possible to distribute unequally the amount of electrical energy dissipated in each zone of the glass mass situated adjacent the electrodes. This is extremely useful in various instances, for example, when the electrodes are situated in those sections of the furnace in which the glass mass should be subjected to different treatments requiring different temperatures.

The furnace shown in Figures 3 and 4 of the drawings comprises side walls 20 which carry a large number of electrodes 21. These electrodes are for instance cylindrical in form and extend at right angles to the flow of the glass mass within the furnace. The diameter of the electrodes 21 is selected sufficiently small so that the lines of current extending between the electrodes are much closer to each other in the zones surrounding the electrodes than in those parts of the glass mass which are situated between these electrodes. Therefore, the electrodes create high temperature zones in the portions of the glass which surround them. The electrodes are arranged at certain distances from each other along the path of the glass and thus provide zones extending at right angles to the longitudinal axis of the tank, which zones have alternately higher and less high temperatures.

As shown in Figure 4 the electrodes are arranged close to the upper level of the glass mass. This arrangement is particularly advantageous since the high temperature zones are thus situated within the path of those elements of the glass mass which are lighter in weight. This lighter weight portion of the glass mass is the one the treatment of which has not yet been completed, and it can be subjected to a very intensive heating process by the electrodes. It is, of course, also possible to arrange one or more electrodes close to the bottom of the tank which would have the further advantage of increasing convection currents. It is well known that the presence of hot zones in the middle of a glass mass having a lower temperature creates convection currents which may be also of use for the stirring of the glass mass.

Convection currents may be also used to spread the action of the hot zones. If it is desired, for instance, that the hot zones should operate at the upper level of the glass it is not necessary that the electrodes be arranged on the actual level of the surface of the bath, i. e., that the glass cannot pass above the electrodes. It may be sufficient that the glass mass which contacts the electrodes and is more highly heated should be able to rise quickly to the upper level of the glass bath without cooling to any noticeable extent. These glass masses rising to the upper level of the bath will heat by their contact the surface layers of the glass. This effect can be further increased by providing electrodes of a certain form, for instance, by using electrodes having smooth lateral surfaces, which offer small resistance to a rising current of glass which would flow along these surfaces. This effect will be further increased if the depth of the layer of glass above the electrode is relatively small.

The furnace shown in Figures 3 and 4 is also provided with transverse electrodes 21. This arrangement of the electrodes is advantageous for the purpose of creating hot zones which extend transversely to the furnace and which thus affect all the glass layers situated adjacent to the upper surface of the glass bath and flowing from the supply end 22 to the delivery end 23 of the furnace.

It is possible, however, to form transverse high temperature zones by means of electrodes 100 (Figs. 13 and 14) which extend individually in the direction of the longitudinal axis of the furnace 101. In that case it is necessary to provide a sufficient number of these electrodes and to arrange them so close to each other that the hot zones around the individual electrodes join each other and form one single hot zone which extends from one side of the furnace to the opposite side transversely to the longitudinal direction of the furnace.

Figure 5 shows a tank 30 carrying three rods 31 which are connected with each other and constitute a composite electrode. A second electrode 32 consisting of a single rod is situated at a distance from the electrode 31. In this construction the three rods constituting the electrode 31 are arranged at the same distance from the bottom 33 of the tank 30.

In the arrangement shown in Figure 6, three rods 40 are situated one above the other and constitute one composite electrode. The second electrode 41 consisting of a single rod is situated at a distance from the electrode 40 and may be arranged for example at substantially the same level as the uppermost rod of the electrode 40. The rods constituting one single electrode extend preferably parallel to each other and are situated close to each other. They are connected to the same terminal of a source of electrical energy.

One advantage of such a composite electrode is that, as compared to a single electrode having the same surface of contact with the glass, a composite electrode acts on a greater mass of the glass bath. A composite electrode has the further advantage that its elements can be removed or exchanged individually without completely interrupting the flow of electrical current and that in the case of the removal of one or more of the rods constituting a composite electrode, the furnace can continue its operation with the remaining electrodes.

The separate rods constituting a composite electrode may be arranged horizontally as shown in Figure 5 or vertically as shown in Figure 6. It is possible to connect rods constituting a composite electrode to the same terminal of the source of electrical energy, giving thus to the several rods of the composite electrode the same voltage. As shown in Figures 5 and 6 the separate rods constituting a composite electrode and the other single rod electrode are situated at different distances from each other. This disturbs the electrical balance between the rods of the composite electrode. However, it is easily possible to restore this balance by establishing between two or more of these rods a small difference of voltage.

Figure 7 shows a tank 50 provided with an upper electrode 51 and a lower electrode 52. The two electrodes extend horizontally one underneath the other and are connected to different terminals of a source of electrical energy, so that the electrical current flows from one of these electrodes to the other one in the vertical plane passing through the two electrodes. In this case the area available for the passage of the current is very great since it is only limited by the horizontal cross section of the tank itself so that zones having a comparatively very high temperature can be created even with electrodes of a comparatively large size.

Figure 8 shows an electrical furnace 60 which is heated by a three-phase electrical current and which is provided with three electrodes 61, 62 and 63 situated in the same horizontal plane adjacent to the upper level of the glass. Due to the fact that the distance between the electrodes 61 and 63 is different from that between the electrodes 61 and 62 or from that between the electrodes 62 and 63, the electrical balance between the three phases would be disturbed if the three electrodes were similar. However, in accordance with the present invention the balance is restored by giving to the middle electrode 62 a smaller surface of contact with the bath than that of the electrodes 61 and 63. Then the resistance of these circuits which include this electrode 62 is increased. If due to the small diameter of the electrode, the resistance offered to the flow of electrical current in the mass of glass surrounding it is great, then the differences in the relative distances between the electrodes have little effect upon the distribution of the load among the three phases.

The furnace 70 shown in Fig. 9 comprises three electrodes 71, 72 and 73 situated one above the other and located substantially close to the bottom of the furnace. The furnace is also provided with the two other electrodes 74 and 75 situated close to the upper level of molten glass at a comparatively great distance from the electrodes 71, 72 and 73. The purpose of the electrodes 71, 72 and 73 is to prevent the flow of horizontal currents between two different parts of the tank.

The electrodes 71, 72 and 73 are arranged in this manner for the following reason:

It is well known that thermic currents are created in the various parts of the furnace due to differences in the temperature of the glass mass. The result of these currents is that properly refined glass is mixed with glass the treatment of which has not yet been completed.

In order to eliminate these currents it was proposed to construct dams consisting of refractory material between various portions of the tank.

In accordance with the present invention to prevent the flow of this current from one compartment to the other, electrodes are located at the place where it is desired to stop the flow from one compartment to the other. The electrodes 71, 72 and 73 introduce the electrical current into the glass mass and may be connected to one terminal of a source of electrical energy. It is also possible to connect the electrodes 71, 72 and 73 to different terminals of the source so that the electrical current will flow between these electrodes. If the electrodes 71, 72 and 73 are connected to one terminal of the source of electrical energy then the other terminal is connected to the so-called auxiliary electrodes 74 or 75.

In both instances the energy developed by the electrical current is concentrated around the electrodes. A vertical zone of hot glass is created which creates rapidly rising glass currents. Therefore, due to this arrangement horizontal glass currents which would flow from one section of the furnace to another section are diverted vertically and thus either totally eliminated or, at least, considerably diminished. In the described arrangement the effect of the vertical rising currents is further enhanced by the fact that the electrodes are bodily situated in the path of the glass flow and form a material obstacle which reduces the cross-sectional passage area available to the glass.

However, in certain instances it may be advantageous to combine the dam formed by the hot glass rising currents with the usual dam consisting of a wall of refractory material. An arrangement of this type is shown in Figures 10 and 11 of the drawings which illustrate a furnace having side walls 80 and 81 provided with projecting portions 82 and 83, respectively, which are situated one opposite the other and which carry three electrodes 84, 85 and 86. Due to the provision of these projections the electrical current is concentrated in the middle of the tank and thus an excessive heating of the side walls 80 and 81 is prevented.

In certain instances it may be sufficient to provide one single horizontal electrode 86 extending transversely to the tank, instead of the three electrodes 84, 85 and 86. That electrode is preferably situated close to the bottom 87 of the tank so that it operates as a dam for the current of glass which tends to flow along the bottom of the tank from the working end to the melting end.

Another advantage of this construction shown in Figs. 9, 10 and 11 is that the effect of the dam constituted by the electrodes upon the glass mass can be regulated by merely regulating the electrical current. If it is desired that currents of glass should flow freely between the melting compartment and the other compartments of the tank furnace, it is merely necessary to interrupt electric current supplied to the electrodes 71, 72 and 73 without actually removing them.

In the construction shown in Figures 1 to 12 the electrodes were shown as extending transversely to the direction of the tank. However, as already mentioned, it is possible to use horizontal electrodes 100 (Figures 13 and 14) which extend in the direction of the longitudinal axis of the tank 101.

It is also possible to use vertical electrodes such as those represented by 102 in Figure 15. These electrodes form a grill structure extending substantially across the entire furnace. The number of the electrodes is sufficiently great and they are placed so close to each other that the glass masses heated by them form one single hot zone extending from one side of the tank to the opposite one.

An important advantage of the described constructions is that it is possible to increase not only the quality of the manufactured glass but also the quantity of glass manufactured by means of a tank of certain dimensions and also to diminish at the same time the amount of heat required for that purpose. This is made possible in accordance with the present invention by creating separate hot zones through which glass is caused to flow in the course of its movement from the feeding end to the delivery end of the tank.

Another advantage of the described constructions is that the position of the hot zones is made independent of the form of the tank and that it is possible to change easily the distribution of hot zones throughout the tank. This variation in the position of the high temperature zones may be easily accomplished by switching the electrodes on and off or by changing their positions within the furnace. This variation is particularly advantageous in comparison with the gas or oil heating systems used in prior art. Figure 12 shows a partial section of a tank 90 provided with an electrode 91 which is rectangular in cross section. This electrode is situated adjacent to the upper level of the glass and also serves as a resistance used for stopping the flow of the glass towards it. The upper portion of the electrode 91 may be covered by refractory element 92 which extends above the level of the glass bath and prevents any flow of glass over the electrode, even though the electrode is completely immersed in the glass. Obviously, the electrode 91 or the refractory element 92 may be replaced at will. Solid floating particles of the glass mass may strike the projecting portions of the heating device and be melted in the high temperature zone surrounding it, while molten glass, which is more dense than the raw materials, may flow underneath the heating device. Due to the arrangement of the electrode 91 adjacent to the upper level of the glass bath, an excessive heating of the bottom of the furnace is effectively prevented.

Moreover the electrodes of some of the furnaces can also be protected over a certain length by a refractory jacket, as shown in Figure 16 where 103 is the electrode and 104 the protecting jackets. Due to this arrangement an excessive heating of the refractory lateral walls 105 and 106 of the furnace is prevented and the electrical current is concentrated in the middle of the tank.

Figures 17 and 18 show a tank 203 provided with a vertical composite electrode 204 and a second composite electrode 205. The electrodes 204 and 205 consist of vertical bars extending through the bottom 206 of the tank. The rods of each electrode are placed substantially close to each other and extend across the entire tank, so that the electrical current also flows along the entire tank in the glass mass.

Figure 20 shows inclined composite electrodes 209 and 210 situated in the tank 207 and extending through the bottom 208, the rods of each electrode being parallel to each other.

The present invention is particularly applicable to furnaces in which the glass mass is heated entirely by an electrical current which is transmitted by electrodes. However, the present invention may also be used in furnaces employing other heating means, such as gas. As shown in Figs. 21 and 22, it is also possible to provide electrodes 212 and 213 in a furnace 214 heated by a series of flames created by the burners 211 situated above the glass. This supplemental heating by means of flames has the advantage of furthering the concentration of heat in the heat zones.

Furthermore, electrodes constructed in accordance with the present invention may be used in combination with electrodes known in prior art and having a large contacting surface and which do not produce the concentration of heat, or in combination with resistances 216 shown in Fig. 21. In other words, the high temperature zones provided by the electrodes constructed in accordance with the principles of the present invention may be combined with the electrical heating known in prior art.

It is particularly advantageous to combine hot zones created by the electrodes constructed in accordance with the present invention with other heating means used for heating the upper surface of the glass. These auxiliary heating means may be arranged above the high temperature zones and may consist of gas burners or electrical heating resistances. Localized zones can thus be formed in which the glass is heated intensively.

Furthermore, in accordance with the present invention the heat concentrated around the electrode may be further increased by using the electrode itself as a resistance, applying to it another electrical current which, instead of flowing from that electrode to the glass flows from one end to the other of said electrode.

When the electrodes form a dam or screen used to prevent the exchange of the horizontal currents of glass between the various sections of the tank, it is often sufficient to have the electrical current flowing through the electrodes in the manner of resistors, without the current passing from one electrode to another one through the glass.

The electrodes can be made of any suitable material such as graphite or metal. Furthermore, electrodes of one furnace may consist of different materials depending upon the section of the furnace in which an electrode is situated, i. e., depending upon whether the electrode is situated in that section of the furnace where the raw materials are introduced or where glass is molten or fused. The electrodes may be fed by any usual known methods with alternating or continuous current.

The appended claims are directed generically to substantially all of the embodiments illustrated in the accompanying drawings and specifically to the species illustrated in Figs. 1 to 5, inclusive. Species of the invention shown in Figs. 6 to 22 of the drawings are claimed in co-pending divisional applications.

What is claimed is:

1. In a glass making furnace wherein the flow of the glass is from one end of the furnace to the other, a plurality of electrodes in said furnace, and means connecting said electrodes to a source of electrical energy whereby current is caused to flow through the glass between said electrodes, at least one of said electrodes being mounted in said furnace between the points of insertion of the glass making materials and of removal of the glass and wholly below the surface of the glass bath so that the glass may flow above and below the same, said last-named electrode extending across substantially the entire width of said furnace.

2. In glass making apparatus wherein glass making materials are inserted in a container at a point adjacent one end thereof and glass is removed from the container at a point adjacent the other end thereof, a plurality of electrodes in said container, at least one of said electrodes being rod-like and extending transversely of the container across substantially the entire width of said container below the surface of the glass bath between said points of insertion and removal so that the glass may flow above and below the same, and means for connecting some of said electrodes to one terminal of a source of electrical energy and the other of said electrodes to a different terminal of said source.

3. In apparatus for treating glass, a container for the glass mass having an inlet adjacent one end thereof for the insertion of glass making materials and an outlet adjacent the other end thereof for removal of glass, a pair of horizontally disposed electrodes wholly below the surface of the glass mass between said inlet and outlet so that the glass mass may flow above and below the same and extending substantially across the entire width of the container, one of said electrodes being spaced from the other in the direction of flow of said glass mass from one end of the tank to the other, and means for connecting said electrodes to different poles of a source of electrical energy.

4. In apparatus for treating glass, a container for the glass mass having an inlet adjacent one end thereof for the insertion of the glass making materials and an outlet adjacent the other end thereof for removal of the glass, a source of electrical energy, a plurality of horizontally disposed electrodes completely immersed in said glass mass between said inlet and outlet so that the glass mass may flow above and below the same and extending substantially across the entire width of the container, means for connecting one or more of said electrodes to one terminal of said source, another electrode immersed in said glass mass between said inlet and outlet, and means for connecting said last-named electrode to another terminal of said source.

5. In apparatus for treating glass, a container for the glass mass having an inlet for the insertion of the glass making materials and an outlet for the removal of the glass, means for heating said glass mass comprising a plurality of electrodes, at least one of said electrodes being immersed in and surrounded by said glass mass and extending across substantially the entire width of the container between said inlet and outlet, the surface area of said last-named electrode in contact with said glass mass being such that the electrical current density in said glass mass is greatest in the zone immediately surrounding said electrode, and means for connecting said electrodes to a source of electrical energy whereby electrical current flows through said glass mass between the electrodes of different polarities.

6. In apparatus for treating glass, a container for the glass mass having an inlet adjacent one end thereof for the insertion of the glass making materials and an outlet adjacent the other end thereof for removing the glass, a plurality of horizontally disposed rod-like electrodes immersed in and surrounded by said glass mass between said inlet and outlet and extending across substantially the entire width of the container, at least one of said electrodes having a sufficiently small surface area in contact with said glass mass so that the greatest electrical current concentration in said mass occurs adjacent the surface of said last-named electrode, and means for connecting said electrodes to a source of electrical energy.

7. In apparatus for treating glass, a container for the glass mass having an inlet for the insertion of the glass making materials and an outlet for removal of glass, means for heating said glass mass comprising at least a pair of electrodes completely immersed in said glass mass and extending across substantially the entire width of said container between said inlet and outlet and means connecting said electrodes to different terminals of a source of electrical energy, the surface areas of said electrodes being such that the current density is greater in the zones immediately surrounding said electrodes than elsewhere in said glass mass to thereby create high temperature zones in said glass mass surrounding said electrodes, one of said electrodes having a greater surface area in contact with said glass mass than at least one of the other of said electrodes to thereby produce heat zones of different intensities around different ones of said electrodes.

8. In a glass making furnace wherein the glass flows from one end of the furnace to the other, at least two electrodes in said furnace, and means connecting said electrodes to a source of electrical energy whereby electrical current is caused to flow through the glass between said electrodes, at least one of said electrodes being mounted in said furnace between the point of insertion of the glass making materials and the point of removal of the glass and wholly below but close to the surface of and surrounded by the glass, said last-named electrode extending across substantially the entire width of said furnace.

9. In a method of manufacturing glass, the steps of supplying glass making materials to one end of a tank furnace, causing the molten mass to flow toward the other end of the furnace, passing an electrical current through said mass longitudinally of the furnace between electrodes completely immersed in and surrounded by said mass to set up at least one restricted high intensity heat zone across the flow path of said mass intermediate the ends of the furnace, said heat zone having substantially uniform extent measured in the direction of flow of said materials and a substantially uniform intensity throughout substantially the entire width of said furnace.

10. In the method of manufacturing glass wherein the glass mass flows from a point of insertion adjacent one end of a tank furnace to a point of removal adjacent the other end thereof, the steps of heating said glass mass by passing an electrical current therethrough between electrodes of different polarities completely immersed in and surrounded by said glass mass, and producing a highly concentrated electrical field around at least one of said electrodes to create around the latter a high intensity heat zone of substantially uniform intensity across substantially the entire width of the furnace, the temperature of said glass mass in said zone being higher than the temperature of said glass mass surrounding the zone.

11. The method of manufacturing glass wherein glass making materials are supplied to a furnace at a point adjacent one end thereof and glass is removed therefrom in a molten state at a point adjacent the other end thereof, the steps of heating the glass mass by passing an electrical current therethrough between electrodes completely immersed in and surrounded by said mass, causing said molten mass to flow toward said point of removal, and controlling the flow of said mass by creating a plurality of high intensity heat zones in said mass spaced from one another in the direction of flow and extending across substantially the entire width of the furnace, the temperature in each of said zones being substantially uniform across the width of the furnace and higher than the temperature outside said zones.

12. In glass making apparatus wherein glass making materials are inserted in a container at a point adjacent one end thereof and glass is removed from the container at a point adjacent the other end thereof, a plurality of electrodes in said container, and means connecting said electrodes to a source of electrical energy whereby current is caused to flow through the glass between said electrodes, at least one of said electrodes being mounted in said container between said points of insertion and removal and wholly below the surface of the glass bath so that the glass may flow above and below the same, said last-named electrode extending across substantially the entire width of said container and having a surface of contact with the glass bath which is less than one-half the smallest cross-sectional area of the glass bath between said last-named electrode and another of said electrodes.

13. In glass making apparatus wherein glass making materials are inserted in a container at a point adjacent one end thereof and glass is removed from the container at a point adjacent the other end thereof, a plurality of electrodes in said container, and means connecting said electrodes to a source of electrical energy whereby current is caused to flow through the glass between said electrodes, at least one of said electrodes being mounted in said container between said points of insertion and removal and wholly below the surface of the glass bath so that the glass may flow above and below the same, said last-named electrode extending across substantially the entire width of said furnace and having a surface of contact with the glass bath which is equal to approximately one-third of the smallest cross-sectional area of the glass bath between said last-named electrode and another of said electrodes.

14. In glass making apparatus wherein glass making materials are inserted in a container at a point adjacent one end thereof and glass is removed from the container at a point adjacent the other end thereof, a plurality of electrodes in said container, and means connecting said electrodes to a source of electrical energy whereby current is caused to flow through the glass bath between said electrodes, at least one of said electrodes being constituted by a plurality of electrically conducting elements mounted adjacent each other in said container between said points of insertion and removal and wholly below the surface of the glass bath so that the glass may flow above and below the same, all of said elements being connected to the same terminal of said source and extending across substantially the entire width of said container.

EDOUARD VIRGILE BOREL.